United States Patent
Keam

(10) Patent No.: US 7,876,424 B2
(45) Date of Patent: Jan. 25, 2011

(54) DISTANCE ESTIMATION BASED ON IMAGE CONTRAST

(75) Inventor: Nigel Keam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 12/194,553

(22) Filed: Aug. 20, 2008

(65) Prior Publication Data

US 2010/0045962 A1    Feb. 25, 2010

(51) Int. Cl.
*G01N 21/00*    (2006.01)
(52) U.S. Cl. ........................................... 356/30
(58) Field of Classification Search ................. 356/30, 356/335–344, 614, 624, 3.01–3.22; 362/606–619, 362/551; 345/173–178, 156–158; 382/150, 382/151, 199, 286, 293–296
See application file for complete search history.

(56) References Cited

U.S. PATENT DOCUMENTS

| 7,006,080 | B2 | 2/2006 | Gettemy |
| 7,114,820 | B1 * | 10/2006 | Parikka et al. ............. 362/602 |
| 7,359,564 | B2 | 4/2008 | Keam et al. |
| 2005/0168448 | A1 | 8/2005 | Simpson |
| 2005/0248540 | A1 | 11/2005 | Newton |
| 2006/0007170 | A1 | 1/2006 | Wilson et al. |
| 2006/0187677 | A1 * | 8/2006 | Parikka et al. ............. 362/619 |
| 2006/0244719 | A1 | 11/2006 | Brigham et al. |
| 2007/0046625 | A1 | 3/2007 | Yee |
| 2007/0063981 | A1 | 3/2007 | Galyean et al. |
| 2007/0201863 | A1 | 8/2007 | Wilson et al. |

FOREIGN PATENT DOCUMENTS

WO    2006103676 A2    10/2006

OTHER PUBLICATIONS

Wilson,"PlayAnywhere: A Compact Interactive Tabletop Projection-Vision System", "Symposium on User Interface Software and Technology", 2005, ACM,New York, USA, pp. 1-10.
Izadi et al,"C-Slate: A Multi-Touch and Object Recognition System for Remote Collaboration using Horizontal Surfaces", retrieved at<<http://research.microsoft.com/users/antcrim/papers/criminisi_tabletop2007.pdf>>, pp. 8. 2007.

* cited by examiner

*Primary Examiner*—Tu T Nguyen
(74) *Attorney, Agent, or Firm*—Allema Hall McCoy Russell & Tuttle LLP

(57) ABSTRACT

The determination of an apparent distance between an object and a surface is disclosed. One disclosed embodiment comprises illuminating the object with a spatially inhomogeneous irradiance from the surface, an intensity variation in the spatially inhomogeneous irradiance in a plane parallel to the surface responsive to a distance between the plane and the surface. Next, an image of the object is acquired while the object is illuminated by the spatially inhomogeneous irradiance, and the apparent distance of the object from the surface is determined based on a brightness contrast in the image of the object due to the spatially inhomogeneous irradiance.

20 Claims, 6 Drawing Sheets

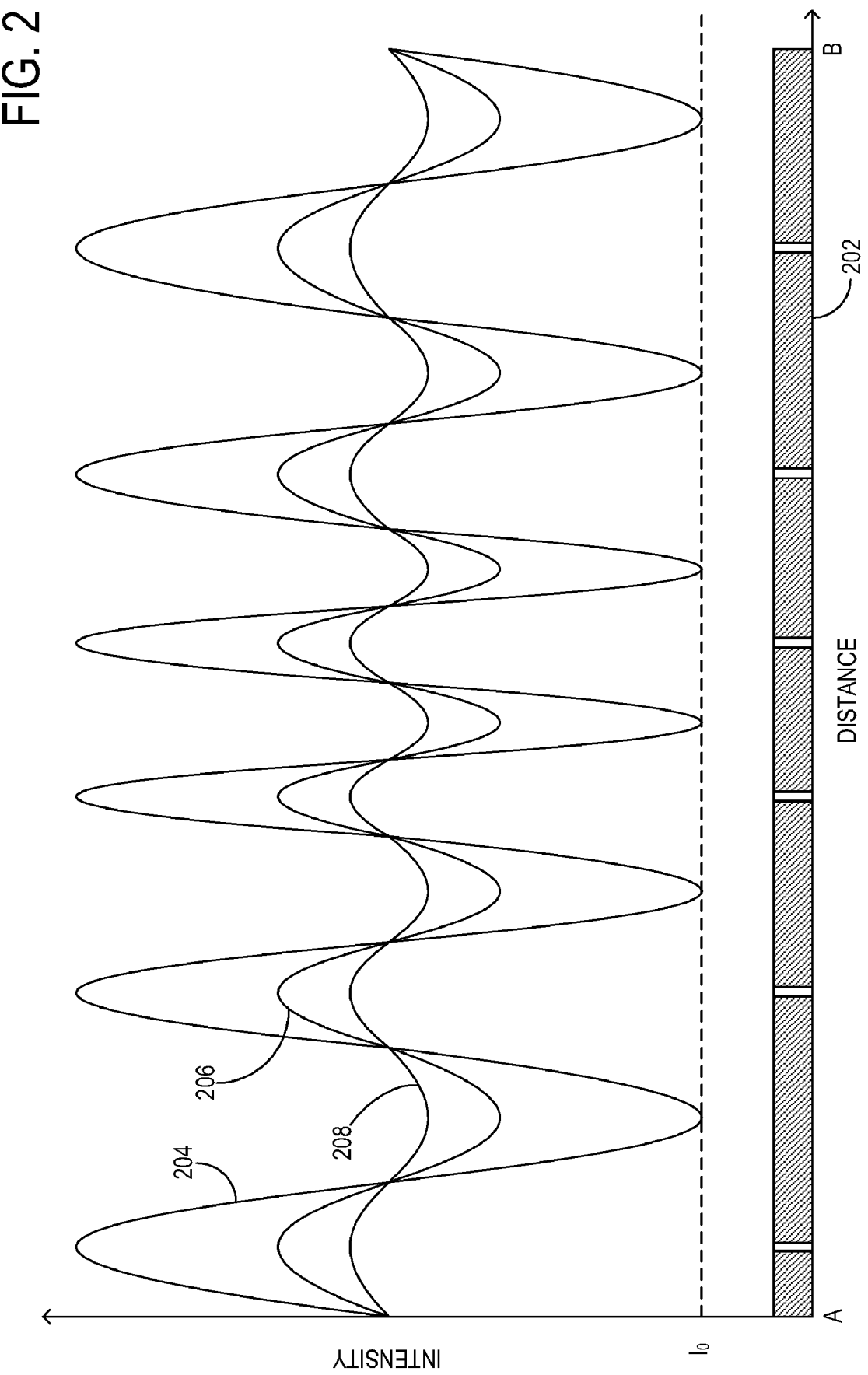

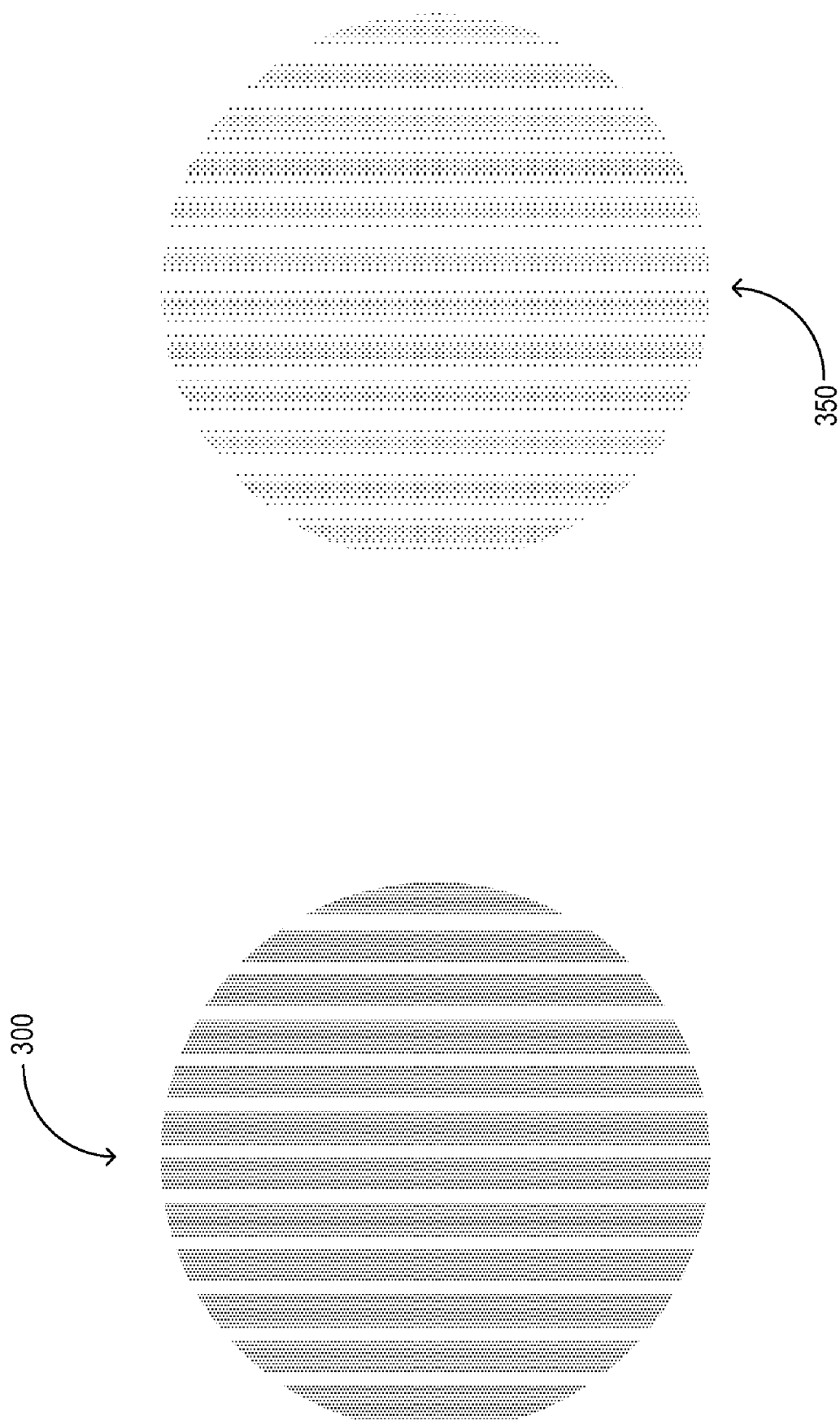

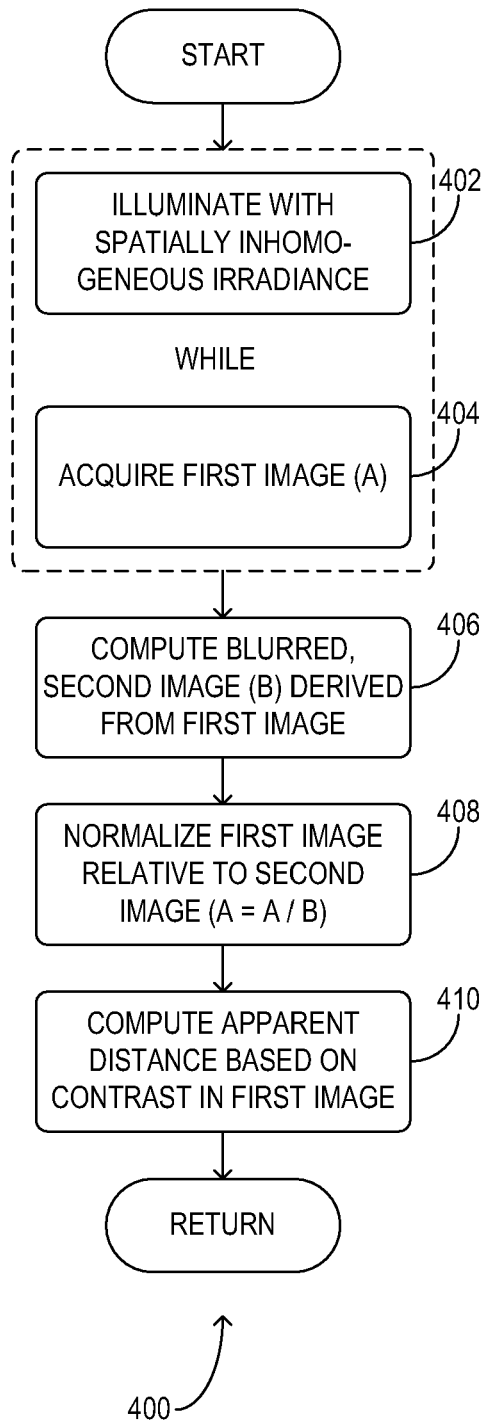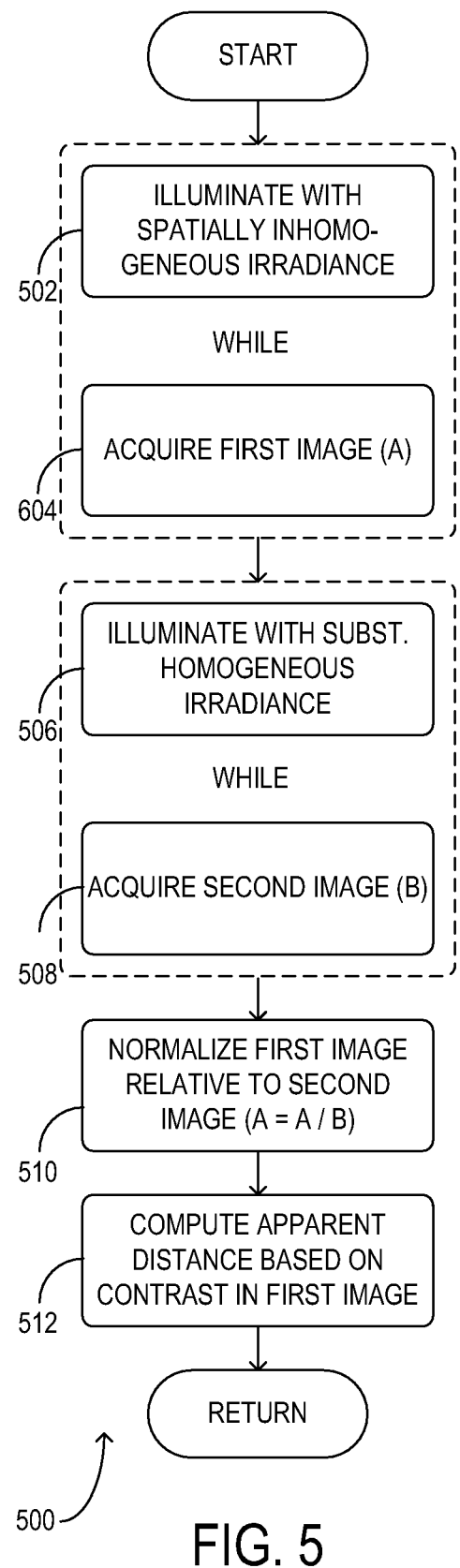

DISTANCE ESTIMATION BASED ON IMAGE CONTRAST

BACKGROUND

Computer systems receive various forms of input and generate various forms of output, of which sound, text, and graphics are examples. Text and graphics may be displayed on a display surface, such as a monitor. Some computing devices may integrate input and output functionality within a common physical structure—for instance, by imparting input capability to an interactive display surface. Touch-sensitive display screens are examples of this approach.

Touch-sensitive devices may utilize any of a number of possible touch sensing mechanisms, including, but not limited to, optical, resistive, and capacitive mechanisms. In any of these forms, a touch-sensitive device may allow the detection and utilization of input that is based on a position of one or more physical objects on a touch-sensitive display surface. For example, the acts of placing an object on a surface, lifting it off a surface, and moving the object from one location on a surface to another each may be a form of input.

SUMMARY

In one embodiment, a method for determining an apparent distance between an object and a surface is provided. The method comprises illuminating the object with a spatially inhomogeneous irradiance from the surface, an intensity variation in the spatially inhomogeneous irradiance in a plane parallel to the surface responsive to a distance between the plane and the surface. The method further comprises acquiring an image of the object while the object is illuminated by the spatially inhomogeneous irradiance, and, determining the apparent distance based on a brightness contrast in the image of the object, the brightness contrast determined from a difference in brightness in the image of the object due to the spatially inhomogeneous irradiance.

It should be understood that the summary above is provided to introduce in simplified form a selection of concepts that are further described in the Detailed Description. It is not meant to identify key or essential features of the claimed subject matter, the scope of which is defined uniquely by the claims that follow the Detailed Description. Further, the claimed subject matter is not limited to implementations that solve any disadvantages noted above or in any part of this disclosure.

BRIEF DESCRIPTION OF THE DRAWINGS

FIG. 2 shows three hypothetical functions plotted on a common coordinate system, each function representing a reflected light intensity from an image of the same object at different distances from an optical touch-sensitive surface, in accordance with the present disclosure.

FIG. 3 represents an image of an embodiment of an object at two example distances from an optical touch-sensitive surface, in accordance with the present disclosure.

FIG. 4 illustrates a process flow of an embodiment of a method for determining an apparent distance between an object and a surface, in accordance with one embodiment of the present disclosure.

FIG. 5 illustrates a process flow of an embodiment of a method for determining an apparent distance between an object and a surface, in accordance with another embodiment of the present disclosure.

DETAILED DESCRIPTION

Figure 1:
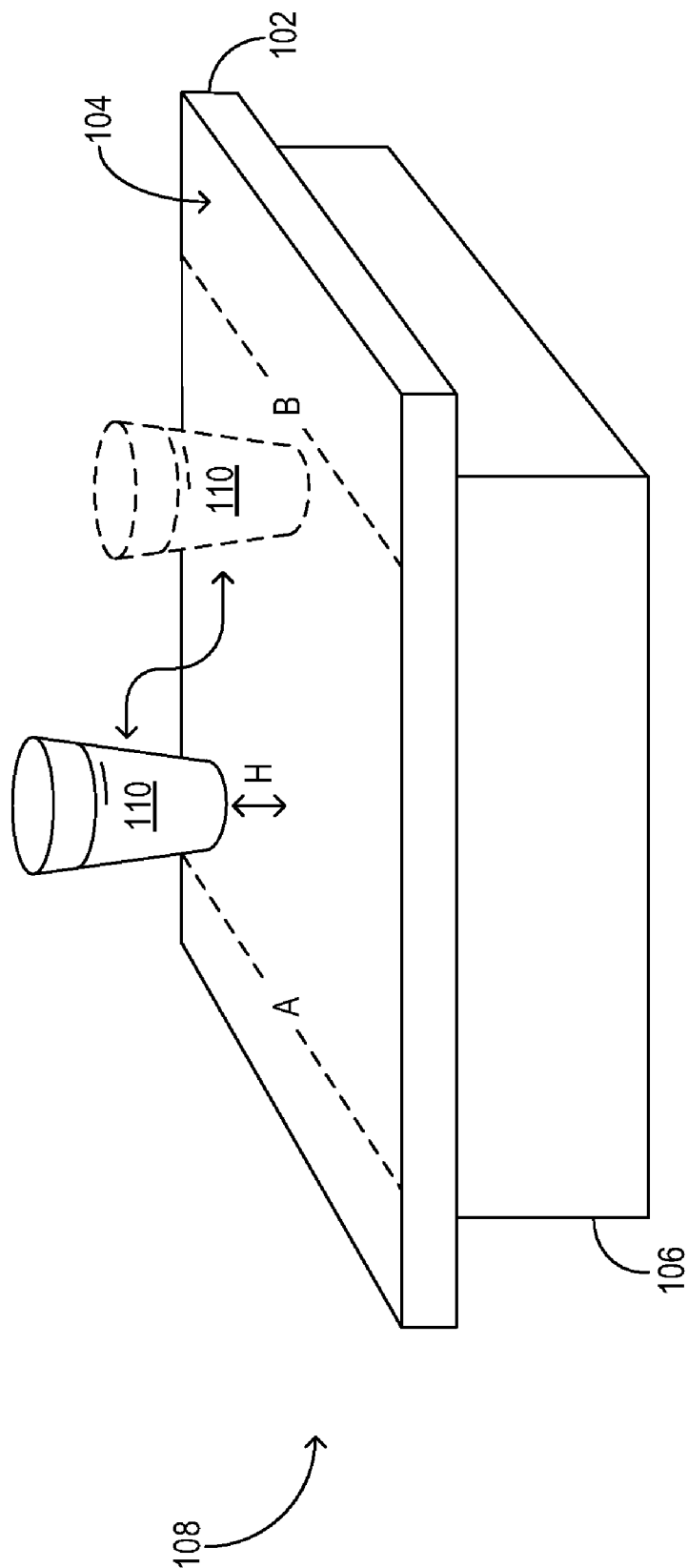
FIG. 1 illustrates a disposition of an embodiment of an object located on an embodiment of an optical touch-sensitive surface, in accordance with the present disclosure.

FIG. 1 illustrates a disposition of an object disposed over a surface in one example embodiment. In particular, the drawing shows substrate 102 having surface 104. The substrate 102 may be a table top, a bench top, a counter top, or a work space of arbitrary size and function. In the illustrated embodiment, surface 104 is shown to be horizontal, but in other embodiments it may have any other suitable configuration and/or orientation.

In FIG. 1, substrate 102 is supported by pedestal 106, which elevates surface 104 above another surface: a floor, a larger table top, etc. Console 108 comprises the substrate and the pedestal, as well as any internal structure on or within the substrate and/or the pedestal. Console 108 may include electronics, e.g., display and imaging electronics, and associated optics. In one, non-limiting example, console 108 may be a surface computing device, and surface 104 may be a display surface of the surface computing device.

In this and other contemplated embodiments, console 108 may be configured to generate an output (a display output at surface 104, for example) and to accept one or more forms of input, (a touch input associated with surface 104, for example). Some forms of input may be based on a disposition of an object relative to the surface. Thus, FIG. 1 shows object 110, which is illustrated as an arbitrary object. Object 110 may be a stylus, a pen, a phone, a personal digital assistant, a book, a beverage glass, or virtually any object that can be placed on, lifted off, or moved upon the surface.

In some embodiments, a determination of whether or not object 110 is in direct contact with surface 104 may be a form of input to console 108. In other embodiments, a height (H) of the object above the surface may be a form of input to the console. Thus, the balance of this disclosure is directed to systems and methods for determining an apparent distance between the object and the surface and for determining whether or not the object is in direct contact with the surface.

When an object is illuminated with a spatially inhomogeneous irradiance, an intensity variation in the irradiance may effect a corresponding brightness contrast in a detectable image of the object. Further, such intensity variation may become larger or smaller with increasing distance from the origin of the irradiance. As a result, the corresponding brightness contrast in the image may depend on the distance between the object and the origin of the spatially inhomogeneous irradiance. For example, if the spatially inhomogeneous irradiance is divergent, the intensity variation may diminish with increasing distance from the origin, such that the corresponding brightness contrast in the image decreases as the object moves farther from the origin. In particular, when the object is relatively close to the origin, the image may exhibit a strong, sharp brightness contrast; when the object is relatively far from the origin, the image may exhibit a weaker, blurrier brightness contrast, the blurriness increasing with increasing distance between the origin and the object. It will be understood that the term "brightness contrast," as used herein, refers to a difference in brightness within an image of an illuminated portion of the object arising from a spatially inhomogeneous illumination of the object.

FIG. 2 shows three hypothetical functions plotted on a common coordinate system. Each function represents a reflected light intensity from an image of the same object. Each function is plotted against distance across an example spatially inhomogeneous irradiance field. In one embodiment, the irradiance field may be disposed along a surface, such as surface 104 of FIG. 1, where the horizontal axis in FIG. 2 represents a horizontal distance, for example, from arbitrary location A to arbitrary location B shown in FIG. 1.

The origin of the spatially inhomogeneous irradiance giving rise to the illustrated plots is represented at horizontal axis 202, where the clear bars indicate regions of lambertian (i.e., isotropic, omnidirectional) irradiance and the dark bars indicate regions of little or no irradiance. The lambertian irradiance may be in the form of "point" sources (i.e. point-like or pseudo-point sources) arranged in a line and/or line sources spanning a plane, e.g. the plane of surface 104. It will be understood that the number of and spacing of light sources illustrated in FIG. 2 is shown for the purpose of example, and that any suitable number and spacing of light sources may be used.

First plot 204 represents a reflected light intensity in the image when the object is close to the origin of the spatially inhomogeneous irradiance, for example, in contact with the surface from which the irradiance emanates. The first plot exhibits relatively intense maxima, where the reflected light intensity is great, and relatively deep minima, where the reflected light intensity is low. The alternating light and dark regions in the image result from and correspond to the intensity variations at the origin of the spatially inhomogeneous irradiance.

Some embodiments may be configured so that the reflected light intensity approaches zero at the minima ($I_0 \sim 0$), while other embodiments may be configured so that the light intensity is significant at the minima. Factors that may affect the magnitude of the light intensity at the minima include, but are not limited to whether images of the object are acquired using a single or dual-pass illumination mode (vide infra). Briefly, deeper minima may be appropriate in embodiments where a separate, substantially homogeneous source of illumination is used in addition to the spatially inhomogeneous irradiance to locate objects, such an illumination mode being particularly useful for reading a value of a tag, bar code, or other detailed object (where zero intensity may increase the difficulty of reading such an object).

Continuing with FIG. 2, second plot 206 represents a reflected light intensity from the image when the object is farther from the origin of the spatially inhomogeneous irradiance than in the first plot. The maxima of the second plot are less intense and the minima are shallower than in the first plot. While the intensity variations at the origin of the irradiance are still represented in the reflected image, they are blurrier and less clearly defined.

Third plot 208 represents a reflected light intensity from the image when the object is yet farther from the origin of the spatially inhomogeneous irradiance than in the second plot. The minima and maxima in the third plot are strongly attenuated compared to the other functions, and the reflected intensity over the entire irradiance field stays relatively close to its average value, the intensity variations at the origin of the irradiance causing relatively small deviations from the average value.

A spatially inhomogeneous irradiance such as that illustrated in FIG. 2 may emanate from a surface, such as surface 104 of FIG. 1, to allow a determination of a distance of an object from the surface. In these embodiments, the origin of the spatially inhomogeneous irradiance may located close to or at the surface. When such irradiance emanates from a surface, the brightness contrast in an image of an object may differ markedly depending on whether the object is in contact with the surface or whether it is disposed above the surface. FIG. 3 illustrates this effect in one, non-limiting example.

Specifically, FIG. 3 represents images of the bottom of object 110 in two example dispositions. First image 300 is an image of the bottom of the object when the object is in contact with surface 104. The first image presents relatively high brightness contrast corresponding to an intensity variation of the spatially inhomogeneous irradiance. Second image 350 is an image of the bottom of the object when the object is disposed above surface 104 by a height H. The second image also presents a brightness contrast corresponding to the intensity variation of the spatially inhomogeneous irradiance, but the brightness contrast in the second image is reduced relative to that of the first image.

The change in brightness contrast of an image of an object caused by the height of an object above a surface may be utilized to compute an apparent distance between an object and a surface, and/or to determine whether or not the object is in contact with the surface. Prior to discussing embodiments of methods for determining a distance between an object and a surface, it will be understood that such methods may be performed by computer-executable instructions or code, such as programs, stored in computer-readable storage media and executed by a processor to implement the methods. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

FIG. 4 illustrates a process flow for determining an apparent distance between an object and a surface in one, non-limiting example. In particular, FIG. 4 illustrates an embodiment of a single illumination-phase process 400. The term "single illumination-phase" as used herein refers to a process wherein a spatially inhomogeneous irradiance is used to provide illumination for each acquired image. In contrast, "dual-phase illumination", as described below, refers to a process wherein a spatially inhomogeneous irradiance and another, substantially homogeneous irradiance are used to provide illumination for acquired images.

Single illumination-phase process 400 begins at 402, where an object is illuminated with a spatially inhomogeneous irradiance from a surface, an intensity variation in the spatially inhomogeneous irradiance in a plane parallel to the surface responsive to a distance between the plane and the surface. In some embodiments, the spatially inhomogeneous irradiance may comprise one or more infrared wavelengths.

The spatially inhomogeneous irradiance may be produced in any suitable manner. For example, as described below, the spatially inhomogeneous irradiance may result from one or more spatially separated, radiant features. Further, in some embodiments, the spatially inhomogeneous irradiance may comprise a regular pattern of irradiance, the regular pattern including radiant points, radiant lines, etc., while in other embodiments, the spatially inhomogeneous irradiance may have a random, pseudo-random, or otherwise non-periodic structure. Non-periodic structure in the irradiance may help to avoid aliasing issues that could arise when a topology or coloration of the object, such as a bar code, is periodic or otherwise similar to the illumination pattern.

At 404, a first image of the object is acquired while the object is illuminated by the spatially inhomogeneous irradiance. In some embodiments, acquiring the first image comprises acquiring an image of the entire surface or a substantial portion of the surface that includes the object, and then locating the object in the image by detecting an edge region of the object within the acquired image.

Next, at 406, a blurred, second image is derived from the first image. The blurred, second image is configured to have a generally even intensity across the image, and may be computed using any suitable blurring method, including but not limited to averaging methods, Fourier filtering methods, etc. Then, at 408, the first image is normalized relative to the second image. In one embodiment, normalizing the first image relative to the second image may include dividing a brightness value of each pixel in the first image by that of the corresponding pixel in the second image.

Single illumination-phase process 400 next comprises, at 410, determining an apparent distance between the object and the surface based on a brightness contrast in the first image, where the brightness contrast corresponds to the intensity variation within the image of the object. The apparent distance may be determined to decrease as the brightness contrast increases. Likewise, the apparent distance may be determined to increase as the brightness contrast decreases. The brightness contrast within the image may be determined in any suitable manner. For example, determining the contrast may include locating maximum and minimum contrast values within the image of the object. Computation at 410 may further include evaluation of a function—analytical, numerical, and/or parametric—that maps the selected brightness contrast to the apparent distance.

In other examples, determining whether an object is on the surface may comprise correlating an acquired image of the object with a reference image, e.g., a stored image of a uniformly colored object in contact with the surface. Positive correlation between the acquired image and the reference image across regions of the acquired image may indicate that the object is on the surface. Such regions may encompass entire objects comprising a large number of pixels or small target regions comprising small numbers of pixels. Further, a level of correlation between acquired and reference images may provide a measure of the apparent distance of the object (or a region of the object) from the surface.

In still other examples, estimating the apparent distance between the object and the surface may comprise correlating the acquired image with a plurality of reference images, e.g. stored images of a white object disposed at various distances from the surface.

FIG. 5 illustrates an embodiment of a dual illumination-phase process 500. To avoid repetition, events in dual illumination-phase process 500 that correspond to those in single illumination-phase process 400 will be identified with a minimum of description. It should be understood, however, that corresponding steps in the single and dual illumination-phase processes may be substantially the same, or may be different.

The illustrated dual illumination-phase process begins at 502, where an object is illuminated with a spatially inhomogeneous irradiance from the surface. At 504, a first image of the object is acquired while the object is illuminated by the spatially inhomogeneous irradiance. At 506, the object next is illuminated with a substantially homogeneous irradiance from the surface. Then, at 508, a second image of the object is acquired while the object is illuminated by the substantially homogeneous irradiance. At 510, the first image is normalized relative to the second image. Thus, in dual illumination-phase process 500, the image used for normalization is an authentic image of the object acquired under substantially homogeneous irradiance. Normalizing relative to an authentic image may offer certain advantages over normalizing relative to a mathematically blurred image derived from the first image, particularly when the object has an inhomogeneous topology and/or coloration. Then, at 512, an apparent distance between the object and the surface is computed based on a brightness contrast in the image of the object, where the brightness contrast corresponds to an intensity variation in the spatially inhomogeneous irradiance.

In embodiments in which determining an apparent distance between the object and the surface comprises determining whether the object is or is not in contact with the surface, the method may include (at 408 of single-illumination phase process 400 and/or 512 of dual-illumination phase process 500, for example) determining that the object is in contact with the surface if a brightness contrast in the image is above a threshold, and, determining that the object is not in contact with the surface if a brightness contrast in the image is below the threshold. In other embodiments, an estimated actual distance between the object and the surface may be determined.

Figure 6:
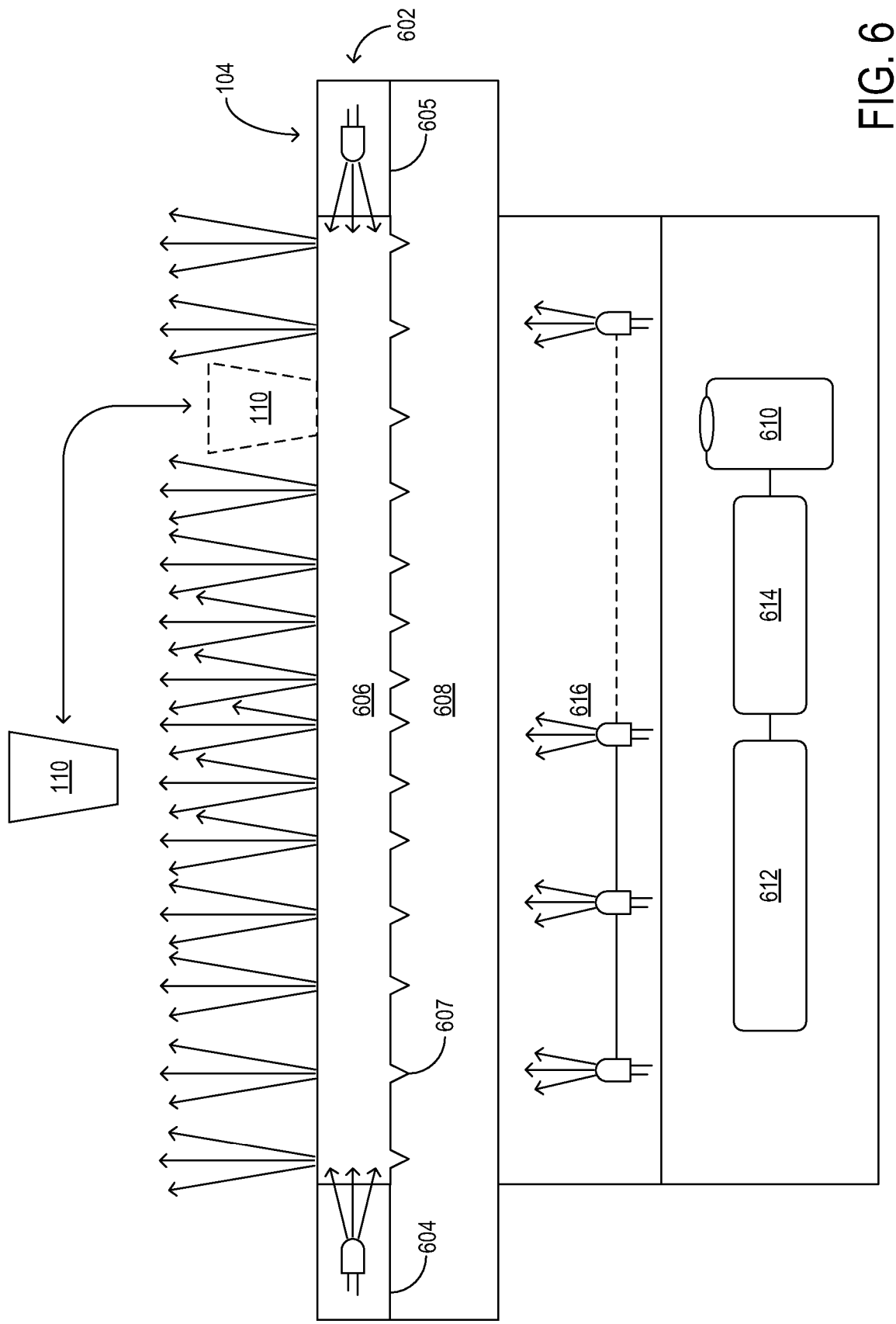
FIG. 6 shows in cross-section an embodiment of a system for determining an apparent distance between an object and a surface, in accordance with the present disclosure.

FIG. 6 shows a sectional view of an embodiment of a system for determining an apparent distance between an object and a surface. As an aid to illustration, FIG. 6 also shows object 110 in two example dispositions. A first illuminator 602 is shown that comprises one or more light sources (e.g. 604 and 605) and first light guide 606. The first light guide includes a plurality of concave structural features (e.g. concave feature 607) configured to cause light from the one or more light sources to diverge from surface 104, forming at least part of the spatially inhomogeneous irradiance. In some embodiments, the one or more light sources comprise one or more infrared light-emitting diodes (IR-LEDs). First illuminator 602 is configured to output spatially inhomogeneous light, as described above.

It will be understood that the dimensions of the components shown in FIG. 6, including but not limited to the illustrated relative thicknesses of the depicted light guides, as well as in other figures described below, may not be drawn to scale; some dimensions may be exaggerated to provide clarity or emphasis, or for other illustrative purposes, and are not intended to be limiting in any manner.

In FIG. 6, surface 104 is an upper surface of first illuminator 602. The first illuminator 602 is configured to provide a spatially inhomogeneous irradiance from the surface, an intensity variation in the spatially inhomogeneous irradiance in a plane parallel to the surface responsive to a distance between the plane and the surface. As noted previously, surface 104 may be a display surface configured to transmit a display image. In the illustrated embodiment, the display image is provided to the surface via liquid crystal display 608. Liquid crystal display 608 is transparent to one or more wavelengths of light that are emitted by one or more light sources (e.g., 604 and 605) and reflected from object 110. In that manner, an image of the object may be acquired while the object is illuminated by first illuminator 602 via a camera disposed on the opposite side of the liquid crystal display. In other embodiments, a camera may be disposed at any other suitable location.

Accordingly, FIG. 6 shows object 110 and camera 610 disposed on opposite sides of surface 104. The term "camera" is used herein to describe any device configured to detect and/or acquire at least a partial an image of an object. In one embodiment, the camera may detect infrared light of the wavelength emitted by the first illuminator 602. Camera 610 may be configured to acquire an image of the object while the object is illuminated by the spatially inhomogeneous irradiance.

FIG. 6 shows processor 612, configured to execute instructions, and memory 614. In this embodiment, the memory comprises instructions executable by the processor to enable a computation of the apparent distance based on a brightness contrast in the image of the object, the brightness contrast corresponding to an intensity variation of the spatially inhomogeneous irradiance.

Figure 7:
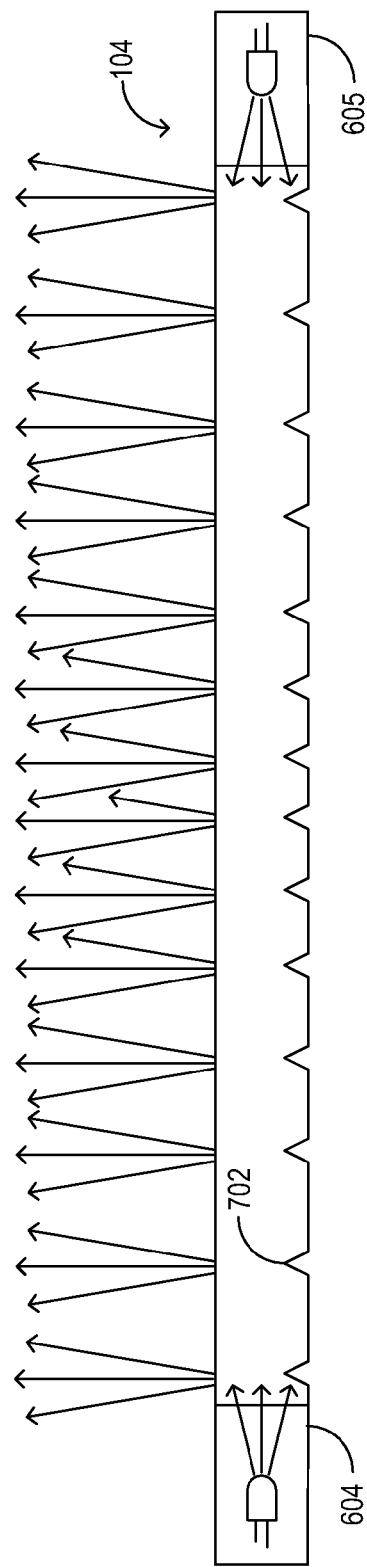
FIG. 7 shows a sectional view of another embodiment of an illuminator.

FIG. 6 shows second illuminator 616 configured to provide a substantially homogeneous irradiance to the object, wherein camera 610 is further configured to acquire a second image of the object while the object is illuminated by the substantially homogeneous irradiance, and wherein processor 612 is further configured to compute the apparent distance based on a brightness contrast in the first image normalized relative to the second image. For the reasons cited above with regard to liquid crystal display 608, it may be advantageous for the liquid crystal display 608 to be substantially transparent to one or more wavelengths emitted by the second illuminator 616 and reflected from the object. In some embodiments, the second illuminator may comprise one or more IR-LEDs, and/or any other suitable infrared light-emitting source In other embodiments, shown by example in FIG. 7, the first illuminator comprises a light guide, wherein the light guide includes a plurality of structural features configured to cause light from the one or more light sources to diverge from surface 104, forming at least part of the spatially inhomogeneous irradiance. The light guide of FIG. 7 is similar to that of FIG. 6, but includes a plurality of convex structural features, e.g., convex feature 702.

The embodiments of the light guides shown in the above-described figures may be formed in any suitable manner. For example, an embodiment of a light guide may be etched or machined from a monolithic substrate, may be cast, extruded, molded, thermally formed under heat from a thermoplastic material, or in any other suitable manner. It will further be understood that other embodiments of light guides may have geometries other than those depicted herein. For example, an embodiment light guide may be substantially wedge-shaped from side to side to allow an image to be projected from a microdisplay located at a side of the light guide, and/or may be configured to be supplied with light from one side only.

In each of the illustrated embodiments, an illuminator radiates light from an origin in the form of one or more radiant points (where the structural features are point feature) and/or one or more radiant lines (where the structural features are line features). As light is reflected out of the depicted light guides by the structural features in the light guides, the intensity of light within the light guides decreases from an edge of the light guides toward a center of the light guides. Therefore, the radiant points or lines decrease in emission intensity as a distance from the IR LEDs or other light source increases. To compensate for this effect, in the depicted embodiments, the one or more radiant points and/or one or more radiant lines are distributed such that a density of more brightly radiant points or lines (i.e. features that are relatively closer to the LEDs) is lower than a density of less brightly radiant points or lines (i.e. features that are relatively farther from the LEDs). This configuration may be useful in providing more uniform illumination over the entire irradiance field than configurations in which the features are equally spaced.

The example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in a control system. It should be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it should be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for determining an apparent distance between an object and a surface, the method comprising:
    illuminating the object with a spatially inhomogeneous irradiance from the surface, an intensity variation in the spatially inhomogeneous irradiance in a plane parallel to the surface responsive to a distance between the plane and the surface;
    acquiring an image of the object while the object is illuminated by the spatially inhomogeneous irradiance; and
    determining the apparent distance based on a brightness contrast in the image of the object due to the spatially inhomogeneous irradiance.

2. The method of claim 1, wherein the apparent distance is decreased as the brightness contrast increases, and the apparent distance is increased as the brightness contrast decreases.

3. The method of claim 1, wherein the image of the object is a first image, and further comprising illuminating the object with a substantially homogeneous irradiance, acquiring a second image of the object while the object is illuminated by the substantially homogeneous irradiance, and normalizing the first image relative to the second image.

4. The method of claim 1, wherein the image of the object is a first image, and acquiring the first image comprises acquiring a second image that includes the object, and locating the first image in the second image by detecting an edge region of the object in the second image.

5. The method of claim 1, wherein the spatially inhomogeneous irradiance comprises one or more infrared wavelengths.

6. The method of claim 1, wherein the spatially inhomogeneous irradiance results from one or more spatially separated, radiant features.

7. The method of claim 1, wherein the spatially inhomogeneous irradiance comprises a regular pattern of irradiance.

8. The method of claim 7, wherein the regular pattern of irradiance comprises one or more radiant points and/or one or more radiant lines.

9. The method of claim 8, wherein the one or more radiant points and/or one or more radiant lines are distributed such that a density of more brightly radiant features is lower than a density of less brightly radiant features.

10. The method of claim 1, wherein determining the apparent distance comprises determining whether the object is in contact with the surface.

11. The method of claim 1, wherein the image is a first image, and further comprising determining a blurred, second image derived from the first image, and normalizing the first image relative to the second image.

12. A system for determining an apparent distance between an object and a surface,
the system comprising:
an illuminator comprising a one or more light sources and configured to provide a spatially inhomogeneous irradiance from the surface, an intensity variation in the spatially inhomogeneous irradiance in a plane parallel to the surface responsive to a distance between the plane and the surface;
a camera configured to acquire an image of the object while the object is illuminated by the spatially inhomogeneous irradiance;
a processor configured to execute instructions; and
memory comprising instructions executable by the processor to enable a computation of the apparent distance based on a brightness contrast in the image of the object due to the spatially inhomogeneous irradiance.

13. The system of claim 12, wherein the object and the camera are disposed on opposite sides of the surface.

14. The system of claim 12, wherein the one or more light sources comprises an infrared light-emitting diode.

15. The system of claim 12, wherein the illuminator further comprises a light guide, wherein the light guide comprises a plurality of structural features configured to cause light from the one or more light sources to diverge from the surface, forming at least part of the spatially inhomogeneous irradiance.

16. The system of claim 12, wherein the illuminator is a first illuminator, and further comprising a second illuminator configured to provide a substantially homogeneous irradiance to the object, wherein the camera is further configured to acquire a second image of the object while the object is illuminated by the substantially homogeneous irradiance, and wherein the processor is further configured to compute the apparent distance based on a brightness contrast in the first image normalized relative to the second image.

17. A method for determining whether an object is in contact with a display surface, the method comprising:
illuminating the object with a spatially inhomogeneous irradiance from the display surface, an intensity variation in the spatially inhomogeneous irradiance in a plane parallel to the display surface responsive to a distance between the plane and the display surface;
acquiring an image of the object while the object is illuminated by the spatially inhomogeneous irradiance; and
determining that the object is in contact with the display surface if a brightness contrast in the image is above a threshold; and
determining that the object is not in contact with the display surface if a brightness contrast in the image is below the threshold.

18. The method of claim 17, wherein the image of the object is a first image, and further comprising illuminating the object with a substantially homogeneous irradiance, acquiring a second image of the object while the object is illuminated by the substantially homogeneous irradiance, and normalizing the first image relative to the second image.

19. The method of claim 17, wherein the image is a first image, and further comprising determining a blurred, second image derived from the first image, and normalizing the first image relative to the second image.

20. The method of claim 17, further comprising correlating at least part of the image with a stored reference image, and determining that the object is in contact with the display surface if a correlation between the image and the stored reference image is above a threshold.

* * * * *